United States Patent

Bertheas et al.

[11] Patent Number: 6,144,342
[45] Date of Patent: Nov. 7, 2000

[54] METHOD FOR CONTROLLING THE NAVIGATION OF A TOWED LINEAR ACOUSTIC ANTENNA, AND DEVICES THEREFOR

[75] Inventors: Jean Bertheas, Villeneuve Loubet; Gilles Moresco, Cagnes/Mer; Vito Suppa, Roquefort les Pins; Bernard Huc, Cagnes/Mer; Didier Soreau, Locmaria-Plouzane, all of France

[73] Assignee: Thomson-CSF, Paris, France

[21] Appl. No.: 09/125,026

[22] PCT Filed: Feb. 11, 1997

[86] PCT No.: PCT/FR97/00263

§ 371 Date: Aug. 13, 1998

§ 102(e) Date: Aug. 13, 1998

[87] PCT Pub. No.: WO97/30361

PCT Pub. Date: Aug. 21, 1997

[30] Foreign Application Priority Data

Feb. 13, 1996 [FR] France ..................... 96 01741

[51] Int. Cl.[7] .................. H01Q 1/04; H01Q 1/34
[52] U.S. Cl. ................ 343/709; 343/719; 114/244
[58] Field of Search .................. 343/709, 719, 343/765; 114/244, 1; 367/3, 123

[56] References Cited

U.S. PATENT DOCUMENTS

| | | | |
|---|---|---|---|
| 3,435,407 | 3/1969 | Bertheas | 367/105 |
| 3,639,695 | 2/1972 | Bertheas | 179/15.55 R |
| 3,745,956 | 7/1973 | Bertheas | 114/23 |
| 3,761,821 | 9/1973 | Bertheas | 325/496 |
| 3,835,448 | 9/1974 | Bertheas | 340/6 R |
| 4,029,141 | 6/1977 | Ferrari et al. | 165/80 |
| 4,279,025 | 7/1981 | Suppa | 367/3 |
| 4,295,211 | 10/1981 | Suppa et al. | 367/4 |
| 4,313,392 | 2/1982 | Guenther | 114/244 |
| 4,380,440 | 4/1983 | Suppa | 441/30 |
| 4,480,322 | 10/1984 | Orieux et al. | 367/123 |
| 4,762,208 | 8/1988 | Reynier et al. | 188/288 |
| 4,766,441 | 8/1988 | Phillips et al. | 343/709 |
| 5,058,082 | 10/1991 | Bertheas et al. | 367/130 |
| 5,517,202 | 5/1996 | Patel et al. | 343/709 |
| 5,795,203 | 8/1998 | Suppa et al. | 441/1 |

*Primary Examiner*—Tan Ho
*Attorney, Agent, or Firm*—Oblon, Spivak, McClelland, Maier & Neustadt, P.C.

[57] ABSTRACT

A method for controlling the navigation of a towed linear acoustic antenna. Birds equipped with variable-incidence wings are fixed onto the antenna. Through a differential action, the wings allow the birds to be turned about the longitudinal axis of the antenna so that a hydrodynamic force oriented in any given direction about the longitudinal axis of the antenna is obtained. Power and control signals are transmitted between the antenna and the bird by rotary transformers. The bird is fixed to the antenna by a bore closed by a cover. The bird can be detached automatically as the antenna is raised so that the antenna can be wound freely onto a drum. This method allows the full control of the deformation, immersion and heading of the antenna.

13 Claims, 10 Drawing Sheets

FIG. 7
SECTION D-D

SECTION C-C
FIG. 8

METHOD FOR CONTROLLING THE NAVIGATION OF A TOWED LINEAR ACOUSTIC ANTENNA, AND DEVICES THEREFOR

BACKGROUND OF THE INVENTION

1. Field of the Invention

The present invention relates to methods which allow the navigation of a linear acoustic antenna towed behind a naval vessel to be controlled. It also relates to the devices which allow this method to be implemented, more particularly to the members known as "birds" placed on this antenna and to the members allowing the said antenna to be deployed and raised by fitting and removing these "birds".

2. Discussion of the Background

It is known that in order to receive acoustic waves propagated through the water, particularly with the purpose of carrying out seismic oil exploration of the sea bed, a series of hydrophones in line one behind the other are towed along behind a towing boat. These hydrophones are usually contained in a pipe which both allows them to be kept in the desired position and allows the signals received by these hydrophones to be transmitted to the towing boat electrically along a series of connecting cables. The acoustic signals received by the hydrophones are converted into electrical signals which are then processed on board the towing boat in order to determine the characteristics of the marine environment and of the sea bed which have just had an influence on these acoustic signals. To facilitate operations, it is desirable for this antenna to remain as straight as possible, at a well-determined and constant depth of immersion. For that, it is known practice for devices in the form of small planes, known in English as "diving planes" or "paravanes" to be fixed to the antenna at various points. These devices are generally fixed to particular lengths of the antenna which comprise appropriate attachment means. The antenna is generally of a large diameter and is therefore relatively rigid, something which facilitates the task of these devices, which can thus be passive and not contain any remotely-controlled adjustment members. Furthermore, to raise this antenna back onto the boat, it often has to be stored on the deck of the boat, possibly disconnecting each of the lengths, something which makes it possible not to have to remove the devices in question.

By way of an example of a purely passive device of this kind, mention may be made of U.S. Pat. No. 5,443,027, in which devices mounted to rotate freely on a towed acoustic linear antenna are described. These devices are kept vertical by a system of flyweights and therefore essentially allow a lateral directional force, and secondarily, a vertical directional force, to be obtained.

Current changes to antennas of this type are tending to minimize their diameter, so that, among other things, they can be wound onto a drum to facilitate the operations of deployment into water and raising. They are also tending to standardize the length portions, so as to have, if possible, no special-purpose length portions, except perhaps at the ends of the antenna. Such an antenna is therefore particularly flexible and the problem of stabilizing it tends to become critical. It is therefore desirable to fit to this antenna devices which will allow this antenna to be stabilized, preferably using active controls, but without placing electromechanical components in the actual antenna itself. Furthermore, in order to be able to wind the antenna onto the raising drum, it is necessary for these devices to be readily detachable and attachable to the lengths of antenna.

SUMMARY OF THE INVENTION

In order to obtain these results, the invention proposes a method for controlling the navigation of a towed linear acoustic antenna, in which method "birds", intended to experience a hydrodynamic force which is transmitted to the antenna in order to control its deformation, its immersion and its heading are fixed to such an antenna, mainly characterized in that control signals are transmitted without electrical contact to the birds in order to make them turn freely about the axis of the antenna so as to orientate the said hydrodynamic force in any given direction about the longitudinal axis of the antenna.

According to another feature, these birds are removed from the antenna automatically as this antenna is raised so that this antenna can be wound freely onto a raising drum.

The invention also proposes a joining piece intended for attaching a bird to a linear acoustic antenna, mainly characterized in that it comprises a cylindrical body of the same diameter as that of the antenna, two connectors located at the ends of the body so that the latter can be inserted between two standard lengths of antenna, a rotary ring equipped with a groove for longitudinally immobilizing the bird on this joining piece, and at least one cylindrical pole piece equipped with a winding to allow the control signals to be transmitted by induction to the bird attached to the joining piece.

The invention also proposes a bird, mainly characterized in that it comprises a body equipped with a longitudinal bore in the shape of a channel intended to sit over a towed acoustic linear antenna, a locking piece placed in the bore to form a boring surface intended to fit the bird onto the antenna, this locking piece comprising a projecting rib intended to immobilize the bird longitudinally on the antenna, at least one pole piece equipped with a winding for receiving by induction from the antenna the signals for controlling the bird, a cover closing the bore in order to keep the bird on the antenna, and locking means for keeping this cover closed when the antenna is submerged.

According to another feature, the bird further comprises at least a second pole piece equipped with a winding to make it possible for the energy for powering the motors for controlling the attitude of this bird to be transmitted by induction from the antenna.

According to another feature, it comprises electronic circuits for servo-control in roll and for controlling the motors intended to obtain this servo-control.

The invention also proposes a mechanism, mainly characterized in that it comprises a fairlead of triangular shape, with the point facing in the direction from which the bird arrives during raising operations, and an accentuated convex shape at this point, and an almost flat shape at the base of the triangle, so as to bring the bird flat by pressing on one of its wings in order to make it turn about the axis of the antenna, and a set of conveyor belts for transporting the bird, flat, between where it leaves the surface of the fairlead and where it is detached from the antenna.

According to another feature, this mechanism further comprises a first turn pulley allowing the antenna to be brought back horizontal after the bird has been brought flat on the fairlead, two arms fixed, on the one hand, to the spindle of the first pulley on each side thereof and, at the other end, gripping a second pulley, and a first detector which can detect that the bird has reached the second pulley; the two arms being raised after this detection from an inclined position into a horizontal position, supporting the bird by its wings, in order to bring the bird/antenna assembly back flat without applying excessive stresses to the bird.

According to another feature, it comprises a second detector for determining whether the bird has been brought flat the wrong way up, and a curved rod in the shape of a spiral intended to be placed in the path of the bird under the action of this detector; this spiral being of a dimension such that the body of the bird can pass through it without difficulty, while one of its wings intercepts the rod which makes the bird turn in its forward movement, so that the bird is brought back flat in the right direction as it leaves this spiral.

According to another feature, it comprises a bore, a buffer which impedes the passage of the key so as to disengage the latter from the body of the bird under the effect of the latter's translational movement, thus allowing the bird to become detached from the antenna to allow the latter to be wound freely onto a raising drum.

BRIEF DESCRIPTION OF THE DRAWINGS

Other specific features and advantages of the invention will emerge clearly in the following description which is given by way of non-limiting example with reference to the appended drawings, which depict.

DETAILED DESCRIPTION OF THE PREFERRED EMBODIMENTS

Figure 1:
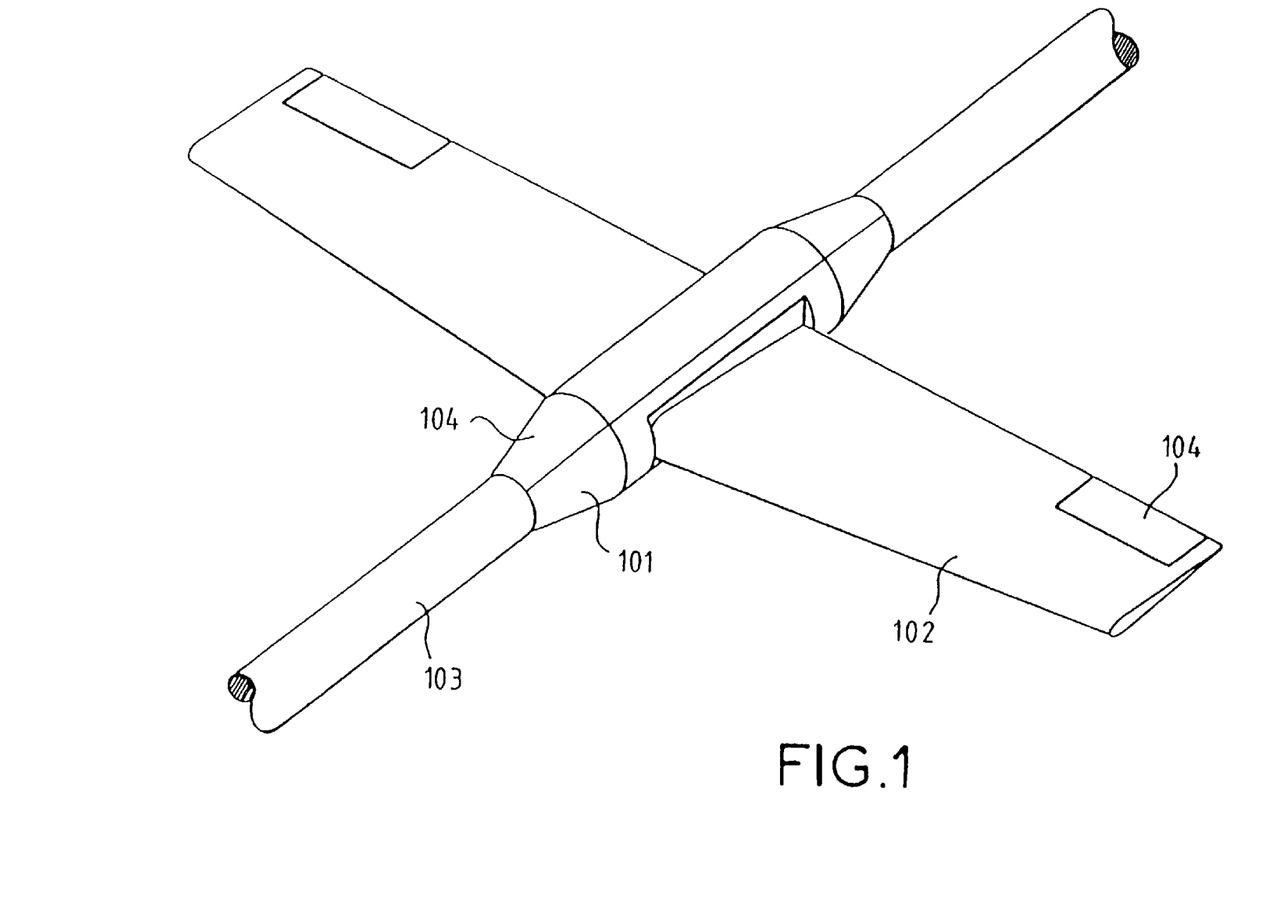
FIG. 1: a diagrammatic view of a bird fixed to an acoustic linear antenna.

The method according to the invention therefore consists in placing on a towed linear antenna 103, devices similar to those depicted very diagrammatically in FIG. 1 and comprising a body 101 and wings 102. These wings form a wing structure which makes it possible to obtain lift, or possibly negative lift, intended to keep the portion of the antenna to which the device is attached at a determined depth of immersion. In the example depicted, the assembly of the wings 102 can turn about a transverse axis in order to alter the angle of incidence of this wing structure. These wings also themselves have flaps 104 which, by a differential action, allow a roll movement to be imparted to the device as a whole, in order to make it turn about the axis of the antenna, so as to obtain, for example, a lateral thrust.

In order not to burden the description, these devices, which will now be described in greater depth, will be called "birds".

By thus individually controlling each bird, the forces exerted locally on the points of attachment of the birds to the antenna allow this antenna to be kept straight, at the desired heading and depth of immersion. A specific deformation can also be obtained.

The birds are fixed to the antenna preferably at connections between two lengths of antenna, so that use can be made of specialist connections allowing these lengths to be joined together without having to modify the lengths themselves. Attachment to these connections is such that the bird can rotate freely about the connection, but so that it is unable to move longitudinally along this connection.

Special-purpose devices, depicted in the figure as a cover 104, allow the bird to be pulled off, preferably automatically, so that the antenna can be wound onto a raising drum.

Figure 2:
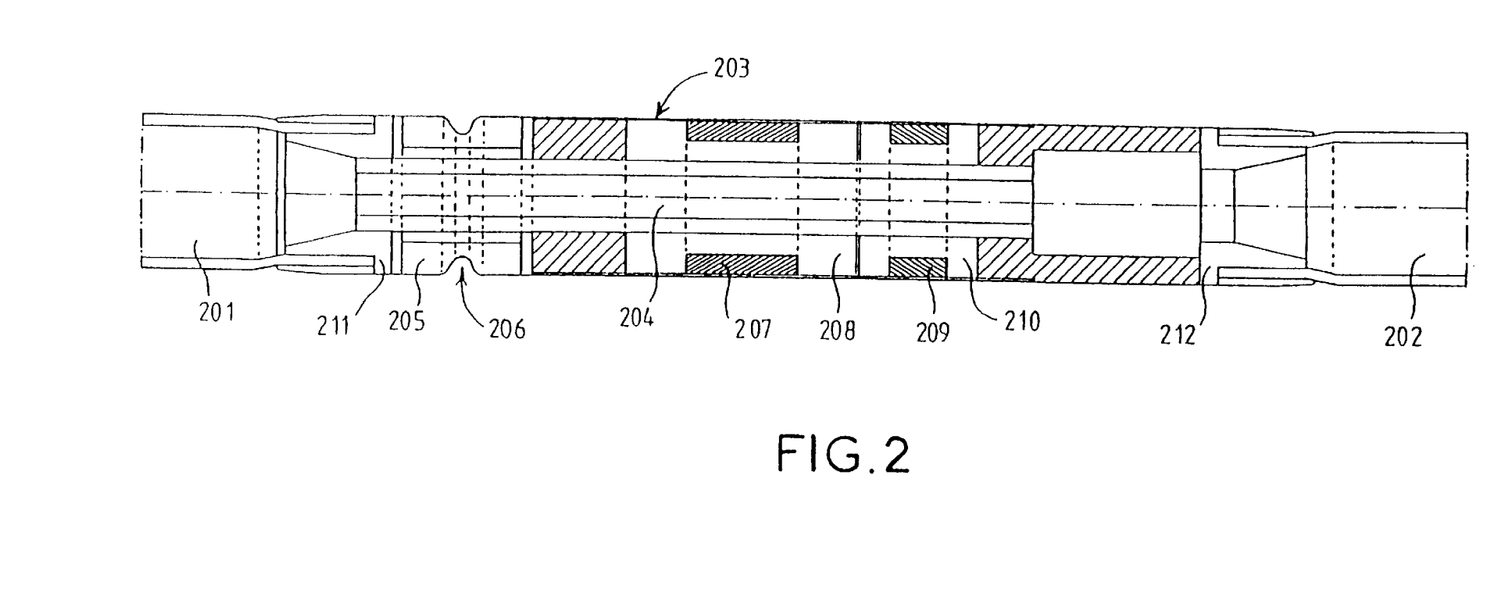
FIG. 2: a view in longitudinal section of an anchoring piece for a bird.
Figure 3:
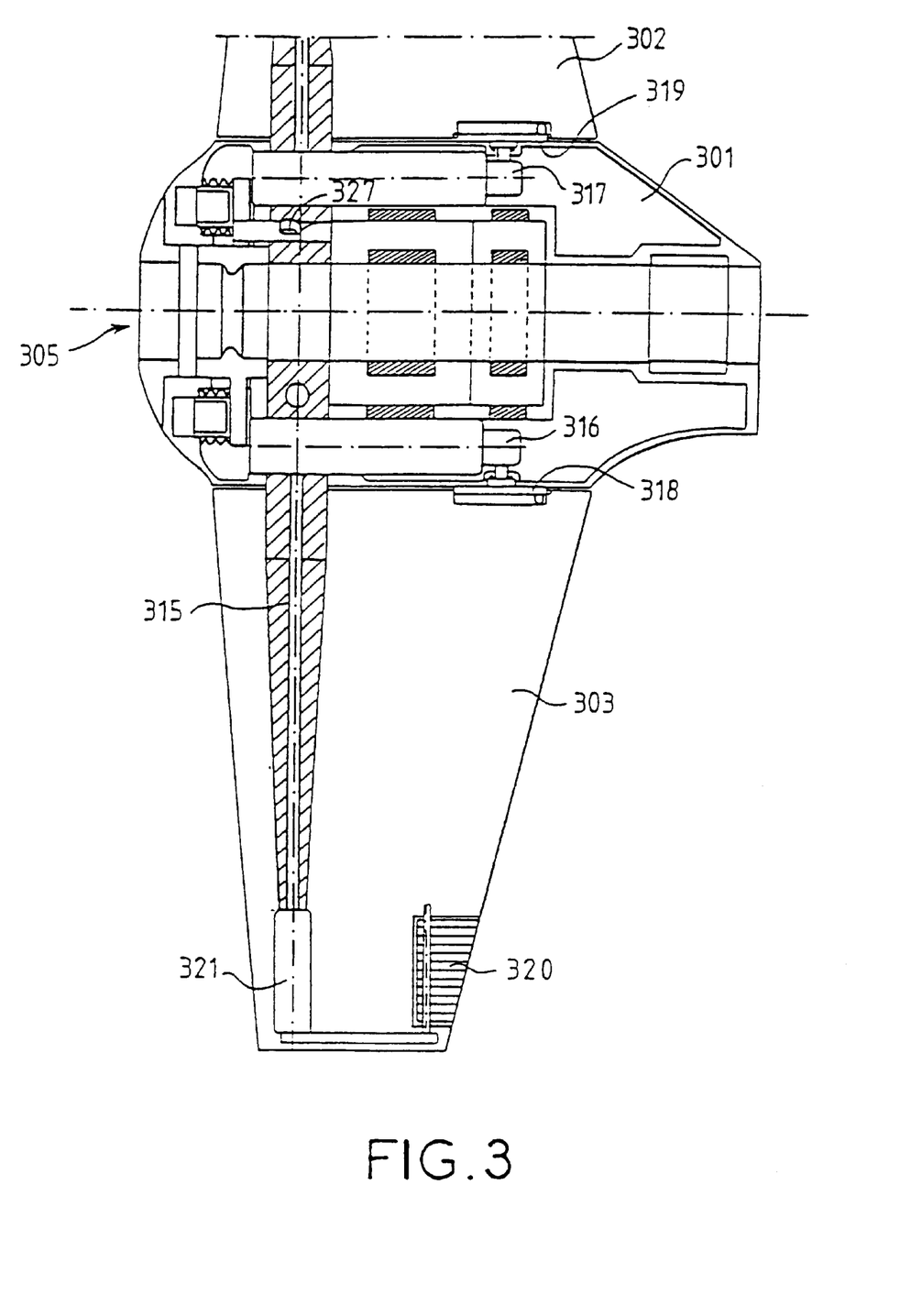
FIG. 3: a view in longitudinal section in the horizontal plane of a bird.
Figure 4:
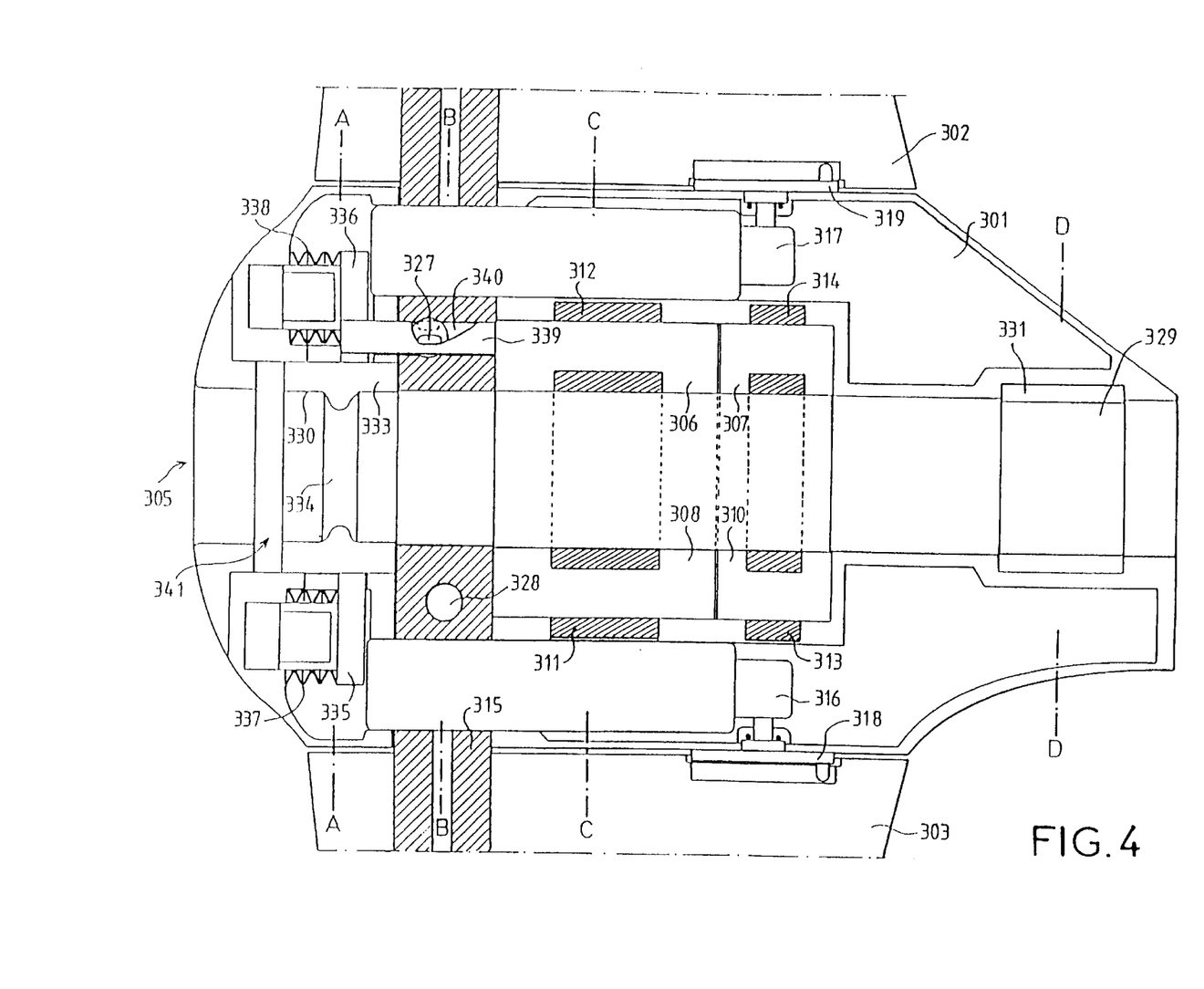
FIG. 4: an enlarged part view of FIG. 3.
Figure 5:
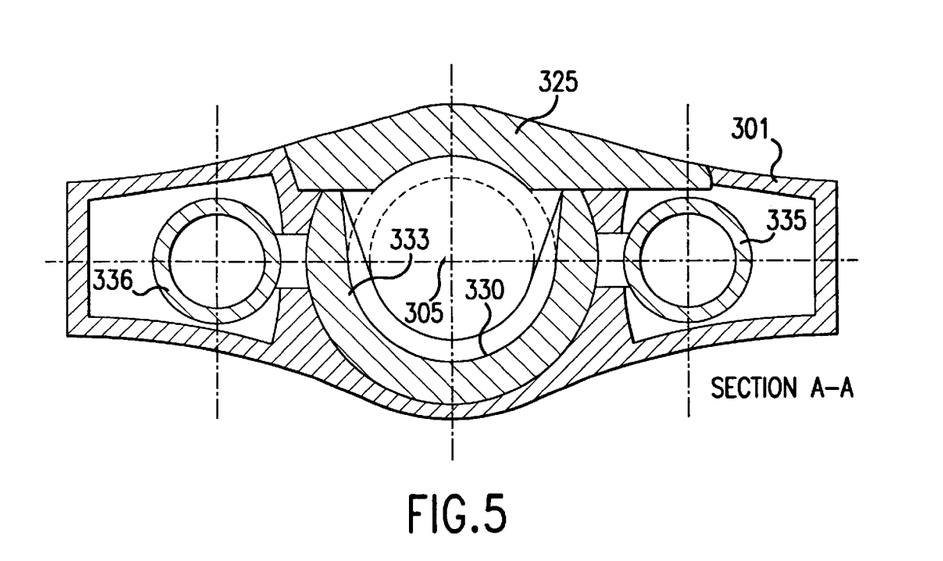
FIGS. 5 to 8: vertical cross-sections through the body of the bird of FIGS. 3 and 4.
Figure 6:
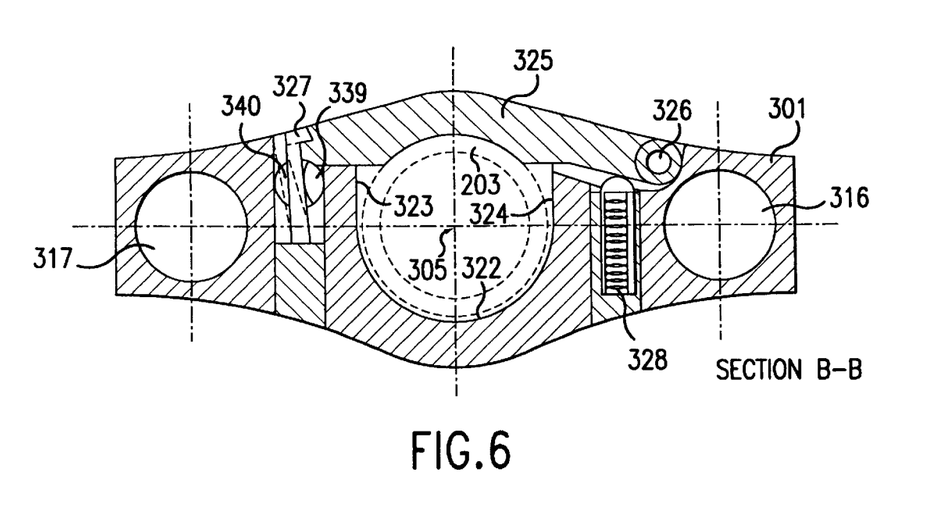
Figure 7:
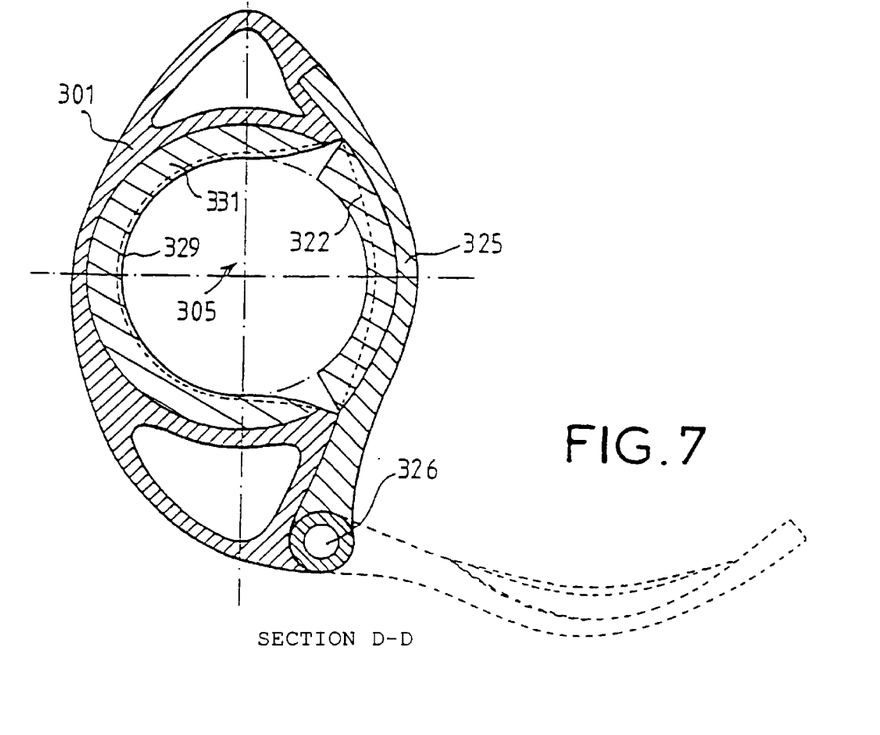
Figure 8:
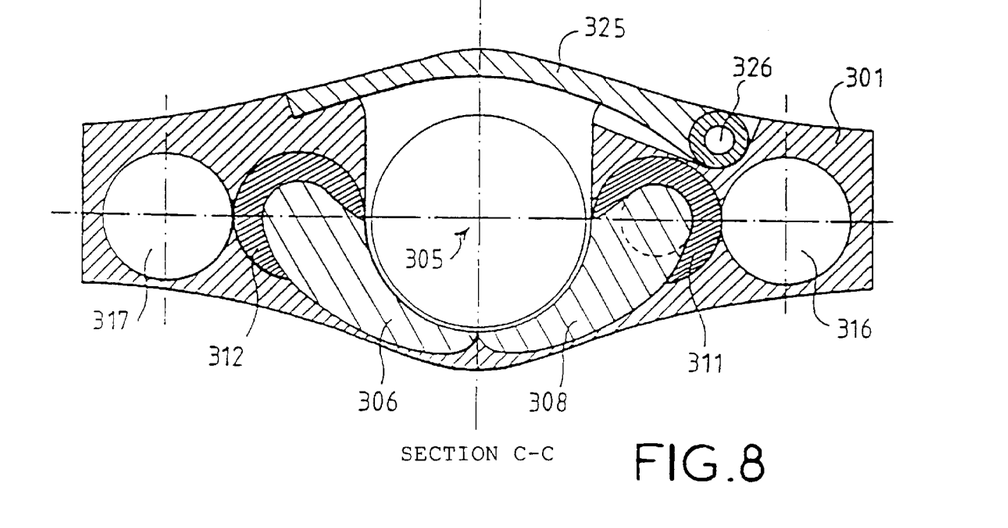

Each bird is therefore fixed to a special-purpose joining piece which, as depicted in section in FIG. 2, allows two lengths of antenna 201 and 202 to be joined together. These lengths are entirely standard, with the possible exception of power supply circuits and control signal transmission circuits, if this do not exist in the linear antennas for which they are ordinarily provided.

The joining piece therefore comprises at each end, connectors 211 and 212 for connecting it to the ends of the lengths 201 and 202. These connectors are identical to the end connectors of the lengths, which allow these lengths to be connected directly to one another, when this joining piece is absent.

The joining piece is made up of a body 203 pierced right through with a longitudinal cylindrical cavity 204 which allows the various cables intended for connecting the length 201 to the length 202 to pass through this joining piece. At one of the ends of this piece there is a rotary ring 205 equipped with a circumferential groove 206. This ring allows the bird to be immobilized longitudinally on the joining piece, while allowing it to rotate freely about the axis of this piece, under the effect of the hydrodynamic forces which will be described later. The rest of the body of the joining piece is essentially occupied by the stators of two rotary transformers. The first of these transformers has a winding 207 and a pole piece 208, which have symmetry of revolution about the longitudinal axis of the joining piece and which allow the bird to be supplied with electrical power. The second transformer comprises a winding 209 and a pole piece 210. Its structure is similar to that of the first but it is smaller because it is used mainly to transmit the necessary control signals to the bird.

These two transformers are powered by connection cables from one and/or other of the two lengths 201 and 202.

An appropriate bird, depicted in section in various views in FIGS. 3 to 8, is fixed to this joining piece. This bird comprises a body 301 equipped with two wings 302 and 303. The body 301 is depicted in horizontal section in FIGS. 3 and 4. The wing 303 is depicted in its entirety in FIG. 3, and partially in FIG. 4. In the latter figure, the body 301 is seen enlarged. The wing 302, which is symmetrically identical to the wing 303, has been depicted partially in the two FIGS. 3 and 4.

The body 301 is pierced longitudinally and axially by a bore 305 in the shape of a channel, which allows it to fit over the piece 203, being held on this piece by means which will be described later. This body comprises at its central part, pole pieces 306 to 310 which fit onto the pole pieces 208 and 210 of the piece 203, so as to allow magnetic flux to be transferred between the piece 203 and the bird. These pole pieces of the bird surround the pole pieces of the piece 203 over 180°, in the way depicted in FIG. 8. They allow power to be supplied to the sets of windings 311 to 314 which, under the effect of these magnetic fluxes deliver, respectively, in the case of the windings 311 and 312, the supply voltage for the electronic circuits and mechanisms of the bird, and in the case of the windings 313 and 314, the control signals intended for the electronic circuits. Each wing is fixed about an axis, 315 in the case of the wing 303 for example, located towards the front of the root of the wing and which allows its angle of incidence to be altered. This angle of incidence is adjusted separately for each wing by motors 316 and 317 which act respectively on each wing via excentrics 318 and 319, situated towards the rear end of the roots.

By altering the angle of incidence of the wings it is thus possible to increase or decrease the lift of the bird. The latter therefore exerts upward or downward tension on the acoustic linear antenna to which it is attached.

By actuating the motors 316 and 317 in a differential manner, the bird can be made to turn about the axis of the piece 203, that is to say about the axis of the linear antenna. As the rotation of the bird about this piece is free, this does not induce torsion in the antenna, something which is of great advantage over the prior art.

Once the bird has been inclined in this way, the hydrodynamic forces exerted on the wings introduce a horizontal component, which makes it possible to manoeuvre the linear antenna including its horizontal plane, in order to keep it straight in this plane or to steer it out of its towed trajectory, just as it can be steered in the vertical plane, as a function of the angle of incidence of the wings.

In the embodiment depicted, it is preferable, in order to obtain this rotation of the bird about the antenna, to use members which are separate from those which allow the angle of incidence of the wings to be altered, in order, among other things, to obtain greater precision in the movements obtained and to make it easier to produce the control signals.

For this, use is made, just like on aircraft, of flaps 320 situated on the trailing edge of the wings at the ends of these wings. These flaps are actuated by motor means 321, themselves situated in the thickness of the wings near the axes 315.

The deformation of the antenna is determined in real time on board the towing boat, by means which are known per se and not depicted, which, for example, comprise pressure-type depth gauges inserted at various points along the antenna, more particularly at the points where the birds are attached, and magnetometers distributed in a similar way. It is thus possible to make use of the reception signals of the antenna hydrophones in conjunction with the reception of a reference signal, emitted, for example, from the towing boat.

The deformation of the antenna being thus determined, the analysis and computation means on board the boat therefore allow the corrective actions to be taken in order to rectify this deformation and obtain the desired shape, a straight line for example, and the desired depth of immersion and orientation of the antenna to be determined.

These actions correspond, taking account of the previously-determined transfer function of the antenna/birds assembly, to the orientations to be given to the wings and to the ailerons of the birds so that the corresponding hydrodynamic forces will yield the desired result. The said transfer function may, as appropriate, be determined by system calibration, which is performed by steering the antenna and determining the disturbances created by particular actions on the control surfaces. Likewise, depending on the results obtained in real time this calibration can be rectified, by determining the discrepancies between the results anticipated as a function of the actions performed on the control surfaces and the results actually obtained. This corresponds to a self-adapting feedback system well known in the art.

The control signals transmitted from the towing boat to the birds via appropriate transformers will be processed in electronic circuits which have not been depicted in the figure. These circuits comprise power components powered by power supply transformers and which can act directly on the motor members 316, 317 and 321. As appropriate, to make signal processing easier, various sensors intended, for example, for determining the angle of roll, the accelerations on the three axes, and possibly the turn angles of the wings and ailerons will be placed in the bird.

In order to be able to place the bird on the joining piece 203, the bore 305 is in the shape of a cup, as can be seen in the various sections AA to DD, and more specifically in section BB. This cup is formed of a semicircular lower part 322 extended upwards by vertical side walls 323 and 324. The bird can thus be sat over the piece 203, by offering it up to this piece from below.

Thus, in order to prevent the bird from being able to escape from this location, a top cover 325 is closed over the piece 203, the outer face of which cover reconstructs the outer face of the body 301 of the bird, so as to preserve its hydrodynamic shape, and the inner face of which has a curvature adapted to the piece 203.

This cover is hinged longitudinally to one side of the body of the bird via a pin 326. In its closed position, it is locked by a hook in the form of a catch 327 situated in a vertical well hollowed into the body 301 on the other side from the pin 326. On the same side as this pin a finger 328, pushed by a spring and sliding in a vertical well allows the cover to be pivoted about the pin 326 when the hook 327 is unfastened, so as to clear the passage for the piece 203 so that the bird can be released from this piece.

Although the piece 203 is a fairly good fit in the recess 305, a rear bearing surface 329 and a front bearing surface 330 are used in order to have firm and dependable guidance. The rear bearing surface is in the form of a bearing made up of a part 331 fixed to the body 301 and of a part 332 fixed to the cover 325.

The front bearing surface is formed by a piece 332, the shape of which is more complicated because it at the same time impedes the longitudinal sliding of the bird along the piece 203. For that, this piece comprises a projecting rib 334, which locks into the groove 206 of the piece 203. It also comprises two lateral extensions 335 and 336 in the form of rings, on which springs 337 and 338 bear. The extension 336 on the same side as the hook 327 supports a rod 339 which extends longitudinally towards the rear of the bird in the region of the hook 327. This rod enters a hole bored in the body and at right angles to the hole in which this hook 327 is placed. The lateral part of this rod is hollowed with a ramp-shaped cutout 340, in which the shank of the hook 327 is housed.

The piece 333 is mounted so that it can slide inside a bore 341 coaxial with the bore 305 and the springs 337 and 338 bear on the front part of the bird, in order to push this piece 333 towards the rear of the bird. In this way, when the springs are relaxed, the hook 327 is at the bottom of the cutout 340 and keeps the cover 325 closed. The force of the springs is designed to be such that the hydrodynamic forces exerted on the bird cannot compress the springs significantly.

Upon raising the linear antenna, on the other hand, when that part of the antenna which supports a bird is raised onto the deck of the boat, just before it reaches the point at which it is to be wound onto the raising drum, it encounters an appropriate device which presses firmly against the body of the bird in order to make it move backwards along the piece 203. This movement is made possible by the sliding of the piece 333 in the bore 341. The force obtained is therefore high enough that it can compress the springs 337 and 338.

Under these conditions, the rod 339 follows the movement of the piece 333 towards the front of the bird and the shank of the hook 327 slides along the ramp of the groove 340, which disengages this hook and allows the cover 327 to be released. This cover opens under the pressure of the finger 328 and the bird can then be disengaged, by lowering it so that the piece 203 comes out of the bore 305 from the top.

Having thus released the bird from the antenna and stored it in a place intended for this use, the antenna can then continue to be wound freely onto the raising drum.

It is of course entirely desirable to be able to raise the antenna in one continuous movement, without having to pause to remove the birds as they appear. It is therefore necessary to use a mechanism that allows this removal to be carried out on the move, without interrupting the movement of raising the antenna.

The difficulty with such a mechanism arises out of the fact that as the bird is free to rotate on the antenna, even if it can be brought out of the water in a standard orientation, as the hydrodynamic forces cease from this moment onwards, it is no longer possible to guarantee that it will have this orientation when it reaches the mechanism for removing the birds.

In order to achieve this result, the inventor is therefore proposing a mechanism that comprises a collection of parts which will be described hereafter.

Figure 9:
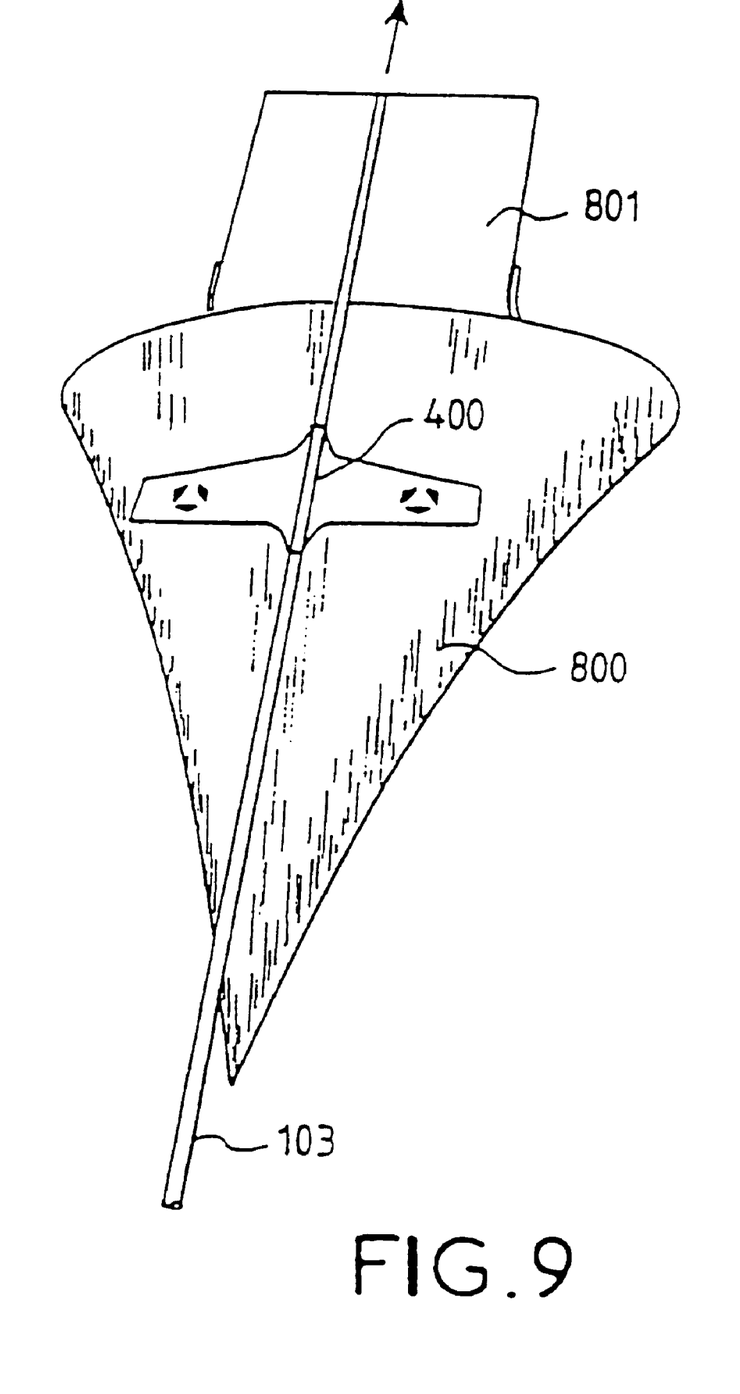
FIGS. 9 to 16: part views of the mechanism for moving the birds from the acoustic linear antenna.

In a first phase, depicted in FIG. 9, the bird 100 attached to the antenna 103 leaving the water arrives at some arbitrary orientation, for example with the wings steeply angled.

According to the invention, the antenna 103 runs at a tangent to a device 800 called a "fairlead", of triangular shape with the point facing in the direction from which the bird arrives, and which has an accentuated convex shape near the point and an almost flat shape at the base of the triangle.

This device is inclined towards the surface of the water, because the antenna leaves the water to progress towards the deck of the boat at a relatively steep angle of inclination.

Thus, whatever the angle of roll of the bird with respect to the antenna as it passes over the front point of the fairlead 800, this point will slide under the body of the bird, and the wing which is tilted downwards will rest against the upper surface of the fairlead, sliding over one or other side of the point.

As it continues to move, the bird rises up towards the broad base of the fairlead, and the wing which slides over the upper surface of the latter comes back horizontal, carrying the entire bird along with it, in order to straighten this bird. At the end of the path over the surface of the fairlead, the bird is completely flat, as depicted in FIG. 9.

It will, however, be noted that this bringing flat may occur the right way up or upside-down, something which poses problems as far as the opening of the cover and the detachment of the bird are concerned. This problem is solved in the way described later.

It is of course necessary to prevent the bird from beginning to turn again about the axis of the antenna as it leaves the fairlead. In order to avoid such an eventuality, subsequent transportation takes place on the surface of conveyor belts, such as the conveyor belt 801 which receives the bird as it leaves the fairlead.

Figure 10:
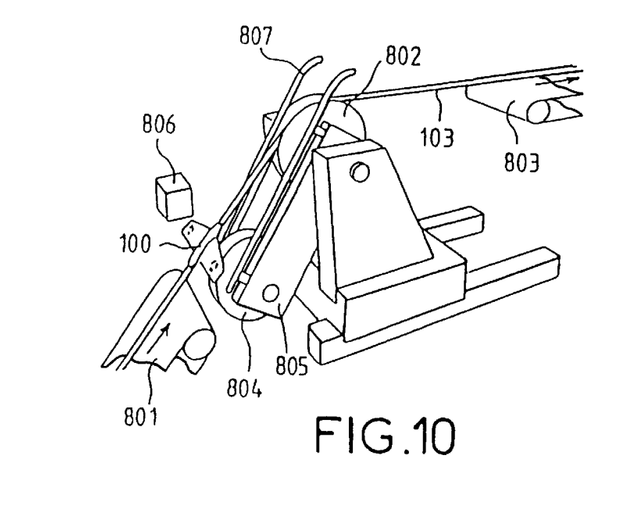
Figure 11:
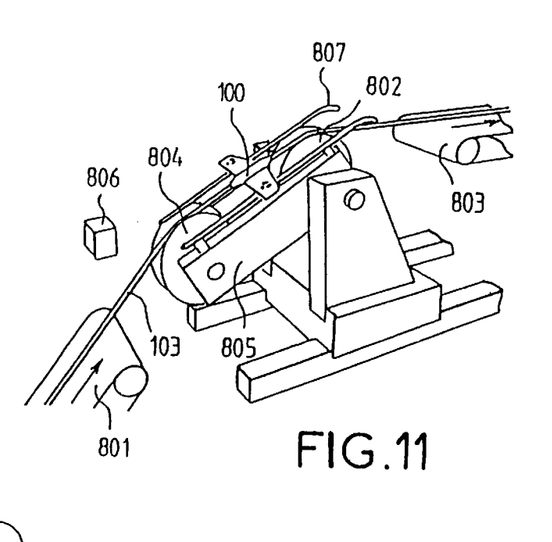
Figure 12:
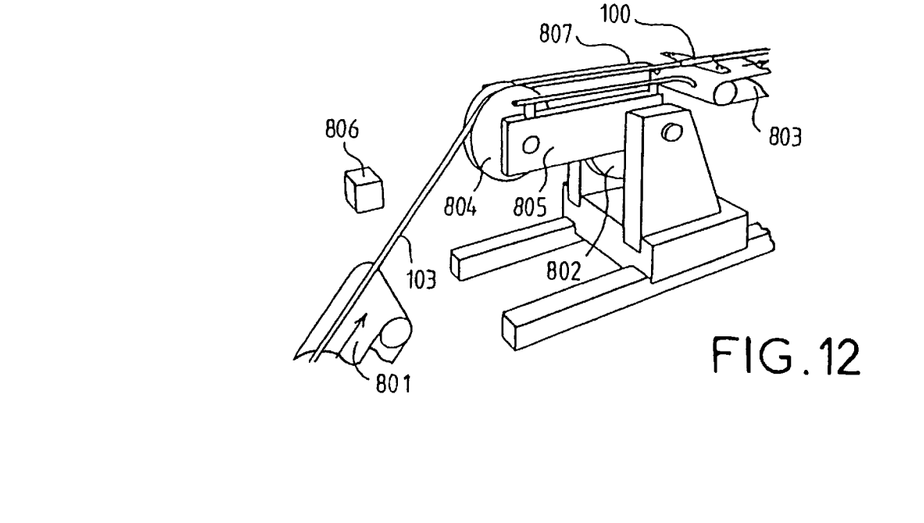

It may perhaps be possible to place the other parts of the bird-detachment mechanism in such a way that they operate on the thus upwardly-inclined antenna, but for reasons of convenience, the invention proposes the use of a system depicted in the various phases of action in FIGS. 10 to 12, in which system the antenna, and therefore the birds attached on it, are returned to a horizontal direction of translation.

For that, use is made of a first pulley 802 which allows the antenna 103 to be brought back horizontal towards another conveyor belt 803.

A second pulley 804 is fixed to the end of two arms 805 which are themselves fixed by their other end to the spindle of the pulley 802. This allows the pulley 804/shaft 805 assembly to rise and fall in the space between the pulley 802 and the conveyor belt 801. In this way, the assembly formed by the two arms and the two pulleys can pass from an inclined position in which just the pulley 802 is used for turning the angle of the antenna, into an approximately horizontal position in which it is the pulley 804 which allows this change in angle.

When the bird 100 has left the end of the conveyor belt 801 to pass over the pulley 804, a detector 806 detects its passage.

Under the action of this detector, motor means, not depicted, rotate the two arms 805 about the spindle of the pulley 802, so as to raise the pulley 804 upwards. They also convey the support structure to which the spindle of the pulley 802 is fixed towards the second conveyor belt 803, so as to ensure continuity of movement.

In this movement, slides 807 surmounting the arms 805 press on the underside of the wings of the bird, so as, first of all, to keep it in the orientation it had as it left the conveyor belt 801 and, secondly, to lift it until it becomes horizontal. This movement takes place in the time during which the bird is sliding along the surface of the slides 807, which makes it possible to obtain a movement which is slow enough to not damage the wings of the bird. This action corresponds to FIG. 11.

At the end of this action, the antenna is brought back horizontal by the pulley 804 and the bird is itself flat and horizontal. It is then taken up as it leaves the slides 807 by the other conveyor belt 803, which is horizontal and will convey it as far as the next part of the mechanism. This phase corresponds to FIG. 12.

The bird, thus returned to the flat configuration, may be the right or the wrong way up, as explained earlier. The latter case corresponds to FIG. 13, where it can be seen that the bird which has reached the end of the conveyor belt 803 is the wrong way up, something which can be perceived by the fact that the roundels which are on the top surface of the wing cannot be seen in the figure.

Figure 13:
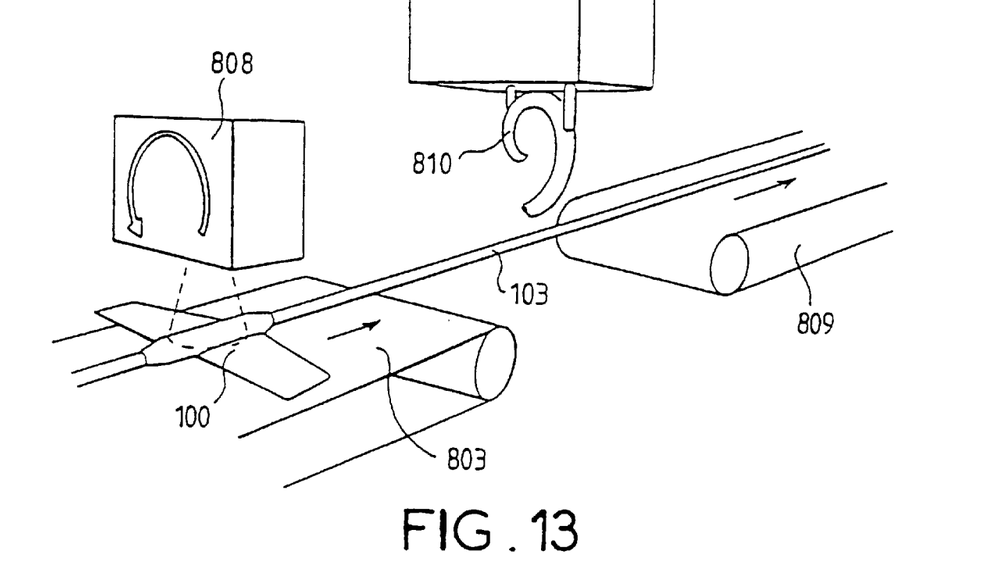

Detection means 808, for example an optical detector, which can detect the presence or absence of the roundels, allow this situation to be identified.

If the bird is the right way up, it is allowed to continue its path with the antenna 103 and it is taken up by a conveyor belt 809, the start of which lies a short distance from the end of the conveyor belt 803, so that the bird does not have time to turn back over again under the effect of an undesirable external stimulus.

Figure 14:
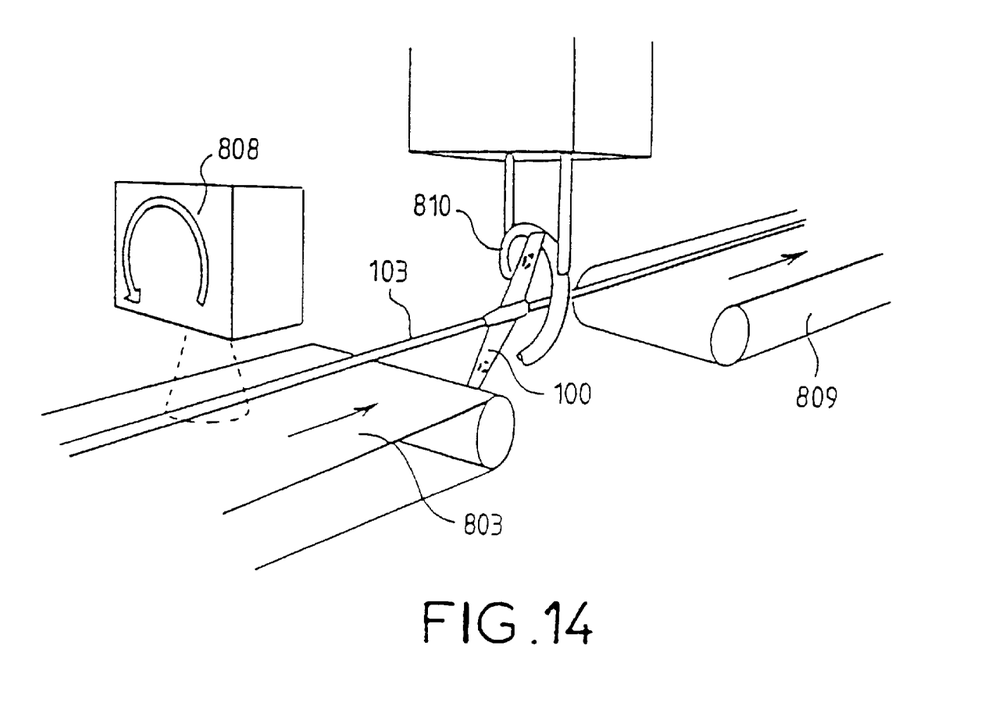

If not, turning means 810, which are held away from the path of the bird in the previous situation, are lowered into this path as depicted in FIG. 14. These means are formed, for example, of a curved rod 810 of a shape and length suited to turning the bird over fully. These dimensions are designed so that the body of the bird can pass through it without difficulty, whereas one of the wings intercepts the rod. Under these conditions, the wing slides along the rod, which then drives this wing, and therefore the entire bird, in a circular movement about the axis of the antenna which is, as has been seen, the roll axis of the bird. This corresponds to FIG. 14.

It will be noted that the direction of winding of the spiral is unimportant because, whichever the direction of winding, the bird performs just half a revolution in order to return to the correct orientation.

At the exit from the conveyor belt 809, a retractable buffer allows the forward travel of the bird to be impeded for long enough for the cover-unlocking mechanism to operate.

With the cover thus unlocked, a mechanism, comprising, for example, receiving arms sliding along the wings, catches the bird to help it become extracted from the piece 203 and slide to a storage location.

The antenna 103 is thus relieved of the bird and can be wound without problem onto the raising drum.

Figure 15:
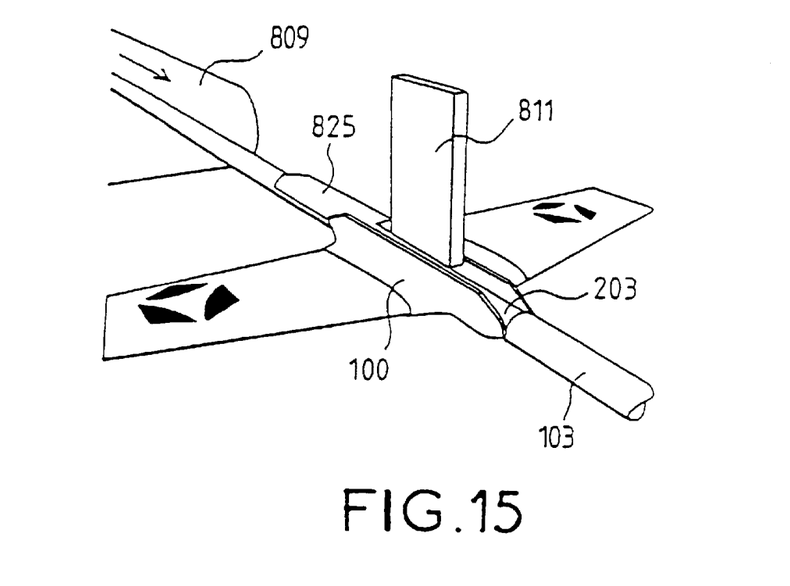
Figure 16:
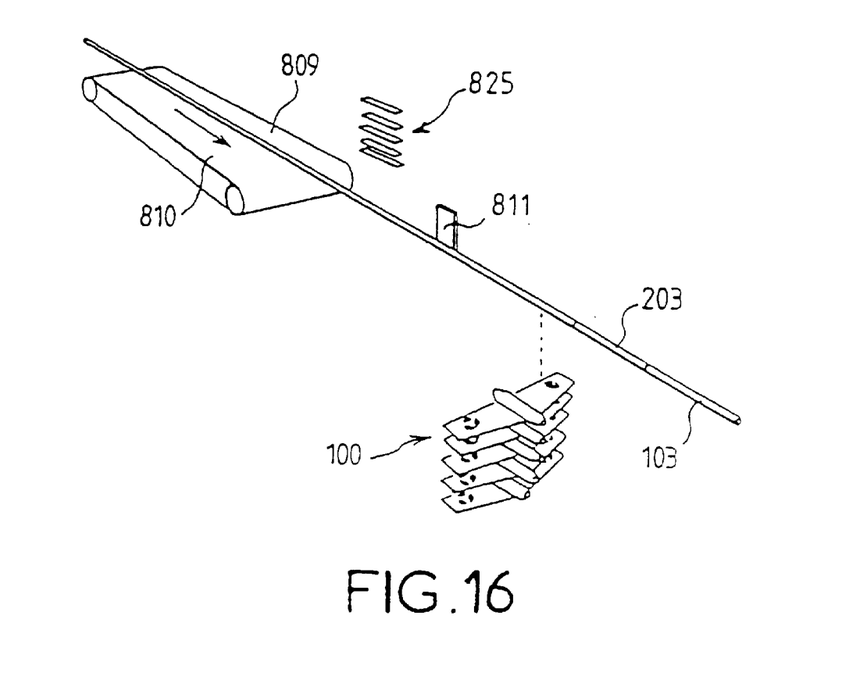

By way of an alternative, FIGS. 15 to 17 depict a bird in which the cover 325 is replaced by a key 825 which is set into the bore 305 in a sliding manner.

In this way, on leaving the conveyor belt 809, as depicted in FIG. 15, a buffer 811 impedes the forward travel of the key 825. The body of the bird 100, continuing to be driven along by the antenna 103, continues its forwards movement, and the buffer 811 therefore disengages the key 825 from this body.

When the key has been fully disengaged, the bird can be released from the piece 203, either under the action of its own weight, or under the action of external means, not depicted, such as, for example, ramps which press on the wings.

The bird is therefore extracted from the piece 203, by dropping downwards, and the antenna 103 finds itself free to be wound onto the raising drum.

A suitable mechanism therefore allows storage, on the one hand, of the birds and, on the other hand, of the keys, for example in an arrangement depicted in FIG. 16 in which this mechanism has not been shown. This mechanism may, for example, be made up of a series of ramps which release in succession, like a photocopier sorter for example.

Going the other way, the laying of the antenna presents no particular difficulties, because the problems of orientating the birds no longer arise. It is therefore possible to use a mechanism based on grippers for example, which pick up the top bird in the pile and lift it up as far as the antenna. The bird is attached to the antenna simply by closing the cover 825 once the bird has been correctly positioned on the antenna. The bird can then follow the reverse path to the one described above, thus passing in turn along the conveyor belts 809, 803 and 801 which will turn in the other direction, then over the fairlead 800 before being plunged into the sea.

The turning mechanisms 810 and the mechanisms 804 and 805 for bringing the birds flat, will then not be active.

What is claimed is:

1. A method for controlling movement of a towed linear acoustic antenna, comprising the steps of:
    subjecting plural birds to a hydrodynamic force, the birds being fixed to the towed linear acoustic antenna;
    transmitting the hydrodynamic force to the antenna to control deformation of the antenna; and
    transmitting control signals to the birds, without electronically contacting the birds, to cause the birds to turn freely about the axis of the antenna and to orientate the hydrodynamic force in different directions about the longitudinal axis of the antenna.

2. A method according to claim 1, further comprising the steps of:
    automatically removing the birds from the antenna as the antenna is raised; and
    winding the antenna onto a raising drum.

3. A method according to claim 2, further comprising the step of:
    holding the birds to the antenna with corresponding joining pieces, the joining pieces each including a cylindrical body having a diameter substantially the same as a diameter of the antenna, two connectors located at respective ends of the body so the body is adapted to be inserted between two standard lengths of the antenna, a rotary ring defining a groove configured to longitudinally immobilize the bird on the joining piece, and at least one cylindrical pole piece having a winding; and
    wherein the step of transmitting control signals to the birds, without electronically contacting the birds, comprises the step of:
    transmitting the control signals to the winding by induction.

4. A method according to claim 2, wherein each of the birds comprises:
    a body having a longitudinal bore in the shape of a channel, the bore being adapted to sit over a towed acoustic linear antenna; and
    a locking piece in the bore, the locking piece forming a boring surface configured to hold the bird onto the antenna, the locking piece including
        a projecting rib configured to immobilize the bird longitudinally on the antenna,
        at least one pole piece having a winding configured to receive from the antenna control signals for controlling the birds,
        a cover that closes the bore to keep the bird on the antenna, and
        a locking device configured to keep the cover closed when the antenna is submerged.

5. A method according to claim 1, further comprising the step of:
    holding the birds to the antenna with corresponding joining pieces, the joining pieces each including a cylindrical body having a diameter substantially the same as a diameter of the antenna, two connectors located at respective ends of the body so the body is adapted to be inserted between two standard lengths of the antenna, a rotary ring defining a groove configured to longitudinally immobilize the bird on the joining piece, and at least one cylindrical pole piece having a winding; and
    wherein the step of transmitting control signals to the birds, without electronically contacting the birds, comprises the step of:
    transmitting the control signals to the winding of the cylindrical pole piece by induction.

6. A bird for controlling movement of a towed linear acoustic antenna, comprising:
    a body having a longitudinal bore in the shape of a channel, the bore being adapted to sit over the towed acoustic linear antenna; and
    a locking piece in the bore, the locking piece forming a boring surface configured to hold the bird onto the antenna, the locking piece including
        a projecting rib configured to immobilize the bird longitudinally on the antenna,
        a first pole piece having a first winding configured to receive from the antenna control signals for controlling the bird, a cover that closes the bore to keep the bird on the antenna, and a locking device configured to keep the cover closed when the antenna is submerged.

7. A bird according to claim 6, further comprising:

a motor configured to control the attitude of the bird; and a second pole piece having a second winding configured to receive energy for powering the motor from the antenna by induction.

8. A bird according to claim 7, further comprising:

a wing with a flap, the wing extending from the body; and wherein the motor comprises:

a servo configured to control the flap.

9. A bird according to claim 6, further comprising:

a wing with a flap, the wing extending from the body; and a servo configured to control the flap.

10. A system for removing birds from an acoustic linear antenna, comprising:

a fairlead having a triangular shape, a point of the fairlead facing a direction from which birds fixed to the acoustic linear antenna arrive when the antenna is raised, the point having an accentuated convex shape, a base of the fairlead having a substantially flat shape configured to bring the birds flat as the birds are raised by pressing on respective wings of the birds to cause the birds to turn around an axis of the antenna; and a set of conveyor belts configured to transport the birds flat from a first point where the birds leave a surface of the fairlead to a second point where the birds are detached from the antenna.

11. A system according to claim 10, further comprising:

a first pulley configured to bring portions of the antenna corresponding to the birds to a horizontal orientation after the respective birds are brought flat on the fairlead;

a second pulley;

a first detector configured to detect when each of the birds reaches the second pulley; and two arms fixed to a spindle of the first pulley and fixed to the second pulley, the two arms being raised from an inclined position into a horizontal position each time the first detector detects that one of the birds has reached the second pulley, the two arms being configured to support the wings of each of the birds when the two arms are in the horizontal position such that the antenna is placed in the horizontal orientation without applying excessive stresses to the birds.

12. A system according to claim 11, further comprising:

a second detector configured to determine whether each of the birds that has been brought flat is right side up; and a curved rod placed in the path of each bird that the detector determines is not right side up, the curved rod having a spiral shape with an inner diameter wider than the birds and narrower than the wings of the birds, so that the bodies of the birds pass through the spiral and the wings of the birds intercept the rod, the rod being configured to turn the birds right side up as a result of intercepting the wings.

13. A system according to claim 12, wherein each of the birds includes a body with a longitudinal bore closed by a key engaged to the body, the system further comprising:

a buffer configured to impede passage of the keys to disengage the keys from the bodies of the birds as each bird passes by the buffer to detach each bird from the antenna before the antenna is wound onto a raising drum.

* * * * *